(12) United States Patent
Sugai

(10) Patent No.: US 7,942,552 B2
(45) Date of Patent: May 17, 2011

(54) LIGHT SOURCE DEVICE AND LIGHT SOURCE PACKAGING METHOD

(75) Inventor: Keigo Sugai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 204 days.

(21) Appl. No.: 12/392,489

(22) Filed: Feb. 25, 2009

(65) Prior Publication Data

US 2009/0225545 A1 Sep. 10, 2009

(30) Foreign Application Priority Data

Mar. 10, 2008 (JP) ................................. 2008-059460

(51) Int. Cl.
*F21V 21/00* (2006.01)
*F21V 29/00* (2006.01)
(52) U.S. Cl. .................................. 362/249.02; 362/373
(58) Field of Classification Search ............. 362/249.01, 362/249.02, 249.06, 249.14, 249.15, 612, 362/555, 373; 257/88
See application file for complete search history.

(56) References Cited

U.S. PATENT DOCUMENTS

| 6,154,362 | A  | * | 11/2000 | Takahashi et al. | 361/695 |
| 6,639,249 | B2 | * | 10/2003 | Valliath | 257/88 |
| 6,650,048 | B2 | * | 11/2003 | Wu | 313/512 |
| 6,670,751 | B2 | * | 12/2003 | Song et al. | 313/512 |
| 6,870,190 | B2 |   | 3/2005  | Okuyama et al. | |
| 6,936,856 | B2 | * | 8/2005  | Guenther et al. | 257/89 |
| 7,090,386 | B2 | * | 8/2006  | Coushaine et al. | 362/555 |
| 7,138,659 | B2 | * | 11/2006 | Raos et al. | 257/79 |
| 7,731,409 | B2 | * | 6/2010  | Nishimura | 362/613 |
| 2009/0201662 | A1 | * | 8/2009 | Kim | 362/84 |

FOREIGN PATENT DOCUMENTS

| JP | 07-131132 A | 5/1995 |
| JP | 2002-335016 A | 11/2002 |
| JP | 2005-153193 A | 6/2005 |
| JP | 2008-016197 A | 1/2008 |

* cited by examiner

*Primary Examiner* — Jong-Suk (James) Lee
*Assistant Examiner* — David R Crowe
(74) *Attorney, Agent, or Firm* — Global IP Counselors, LLP

(57) ABSTRACT

A light source device includes a base member and a light guiding section. The base member has a plurality of layers with each of the layers including a plurality of light emitting bodies, the base member having a light emitting surface. The light guiding section is arranged in the base member. The light guiding section is configured and arranged to guide light rays emitted from the light emitting bodies disposed in at least one of the layers to the light emitting surface.

9 Claims, 7 Drawing Sheets

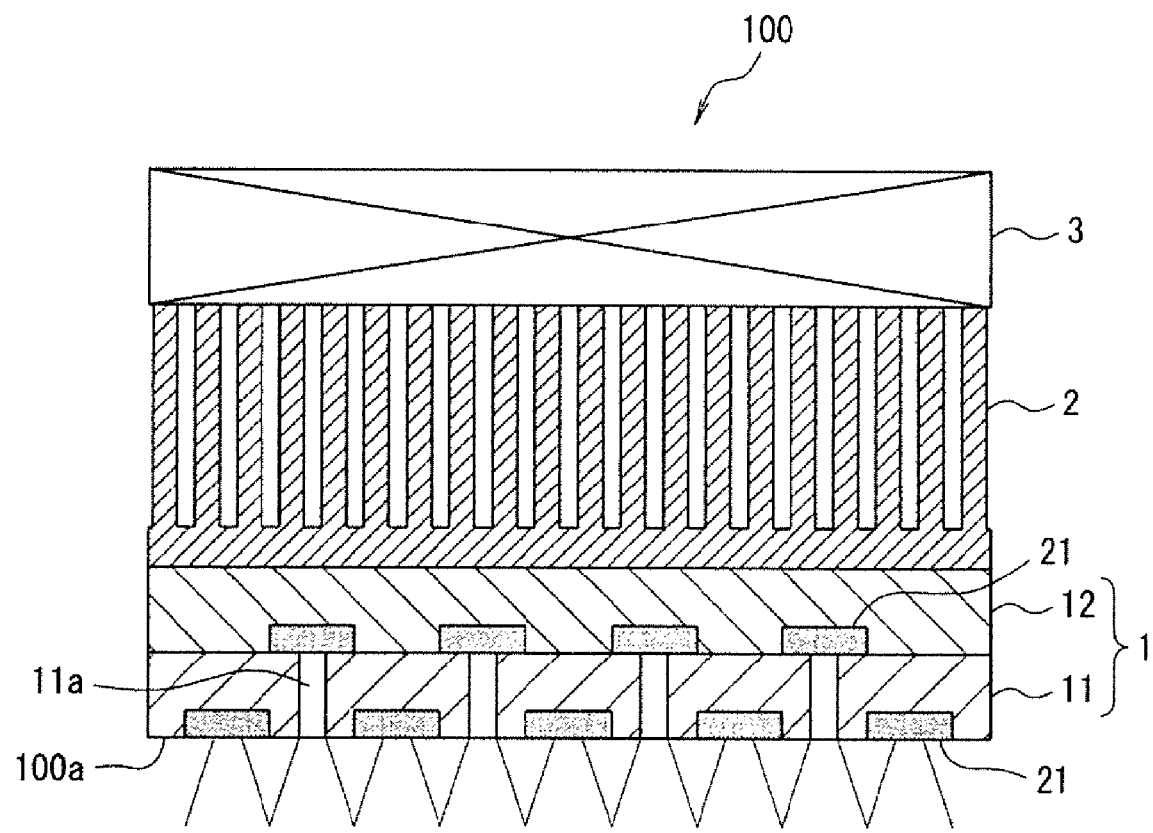
F I G. 1

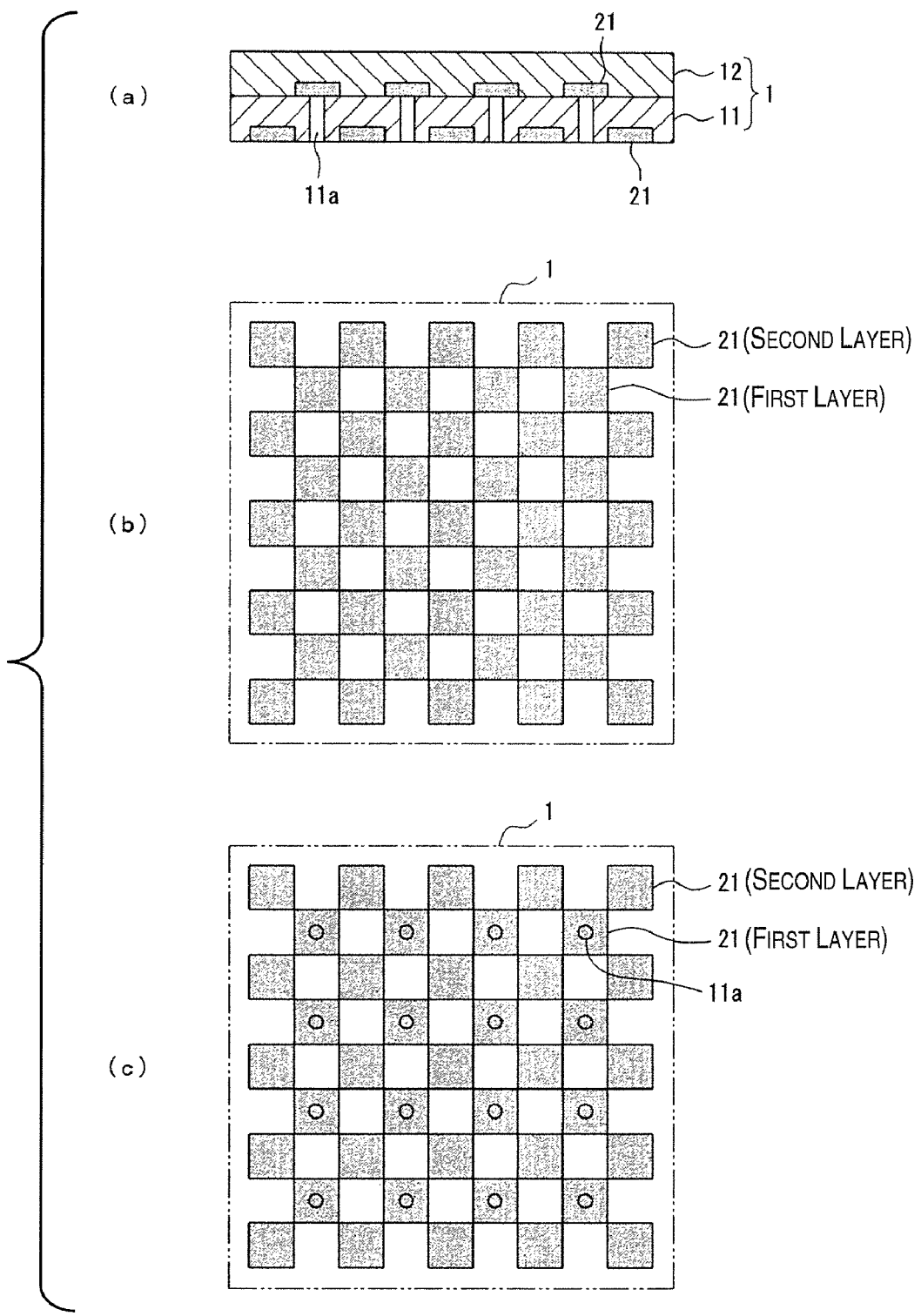
F I G. 2

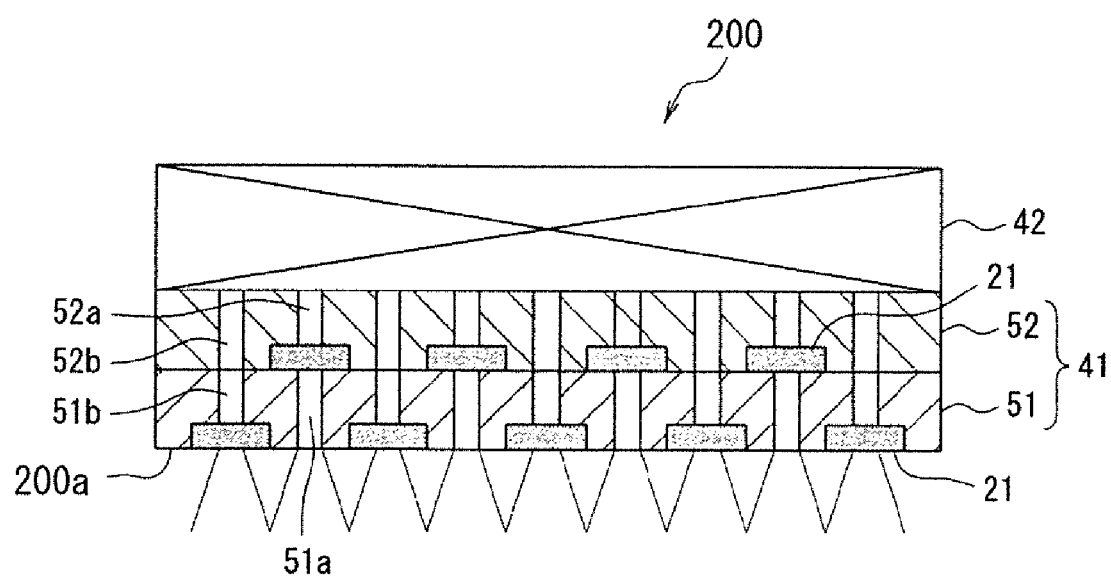
F I G. 3

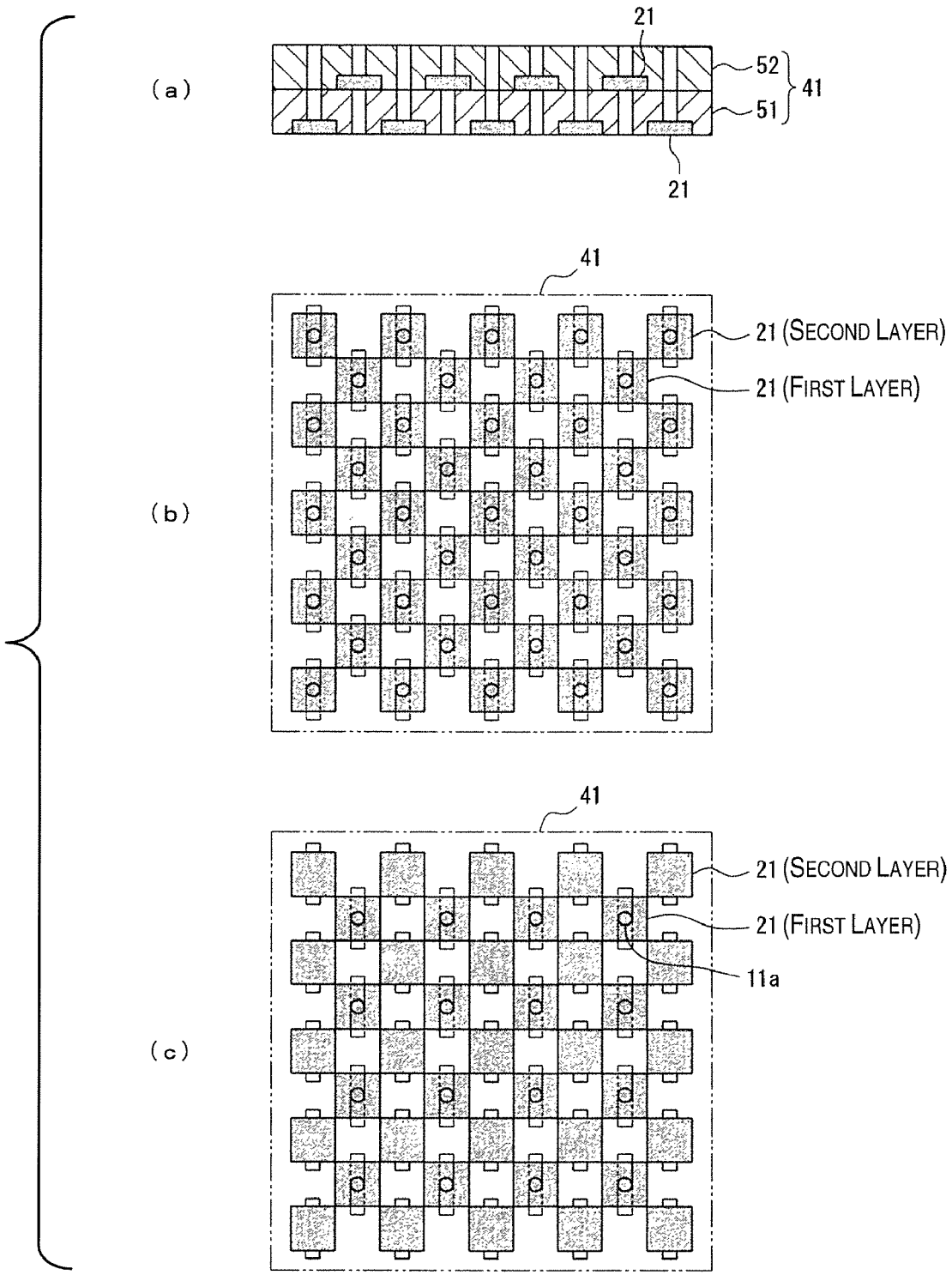
F I G. 4

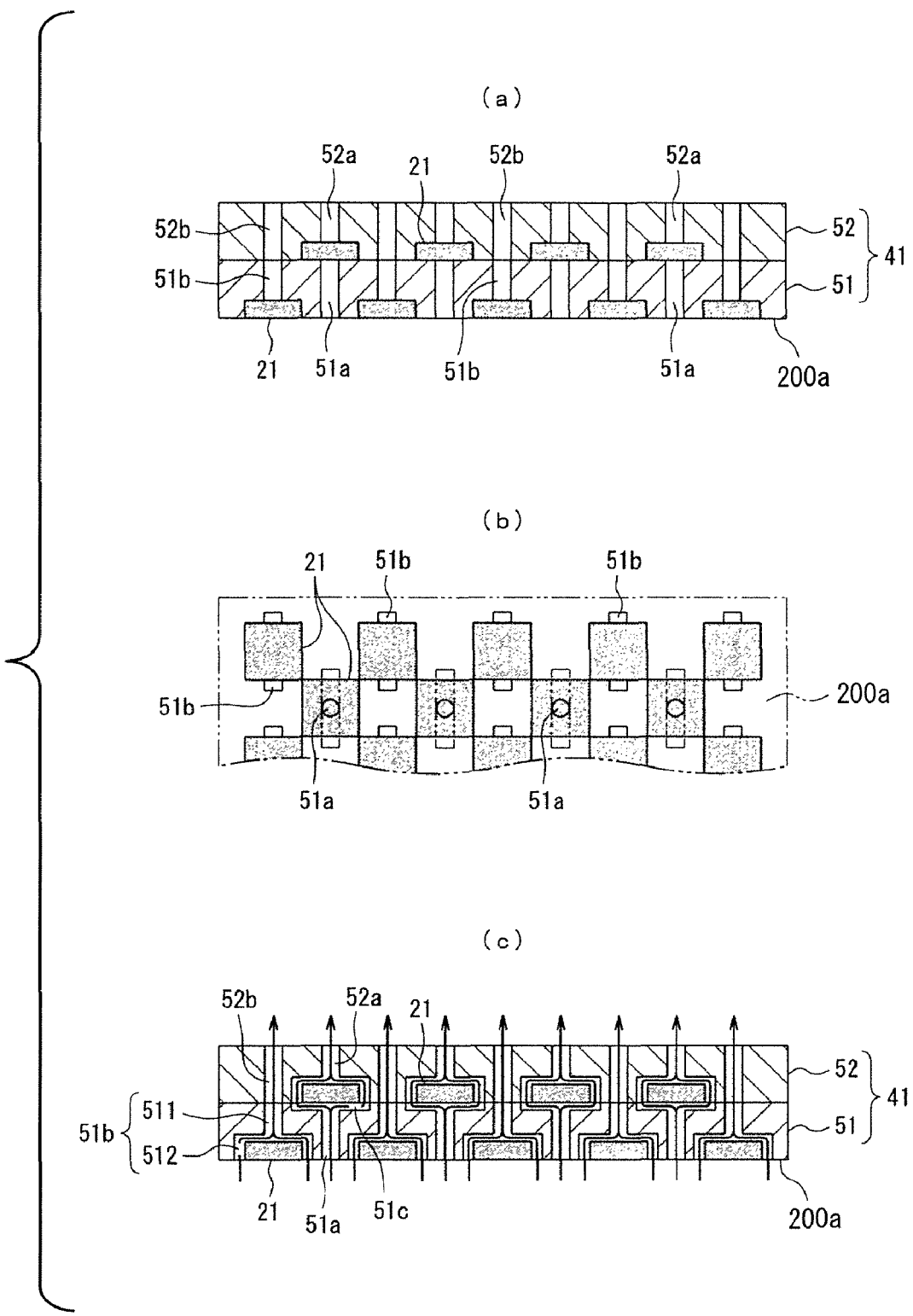
F I G. 5

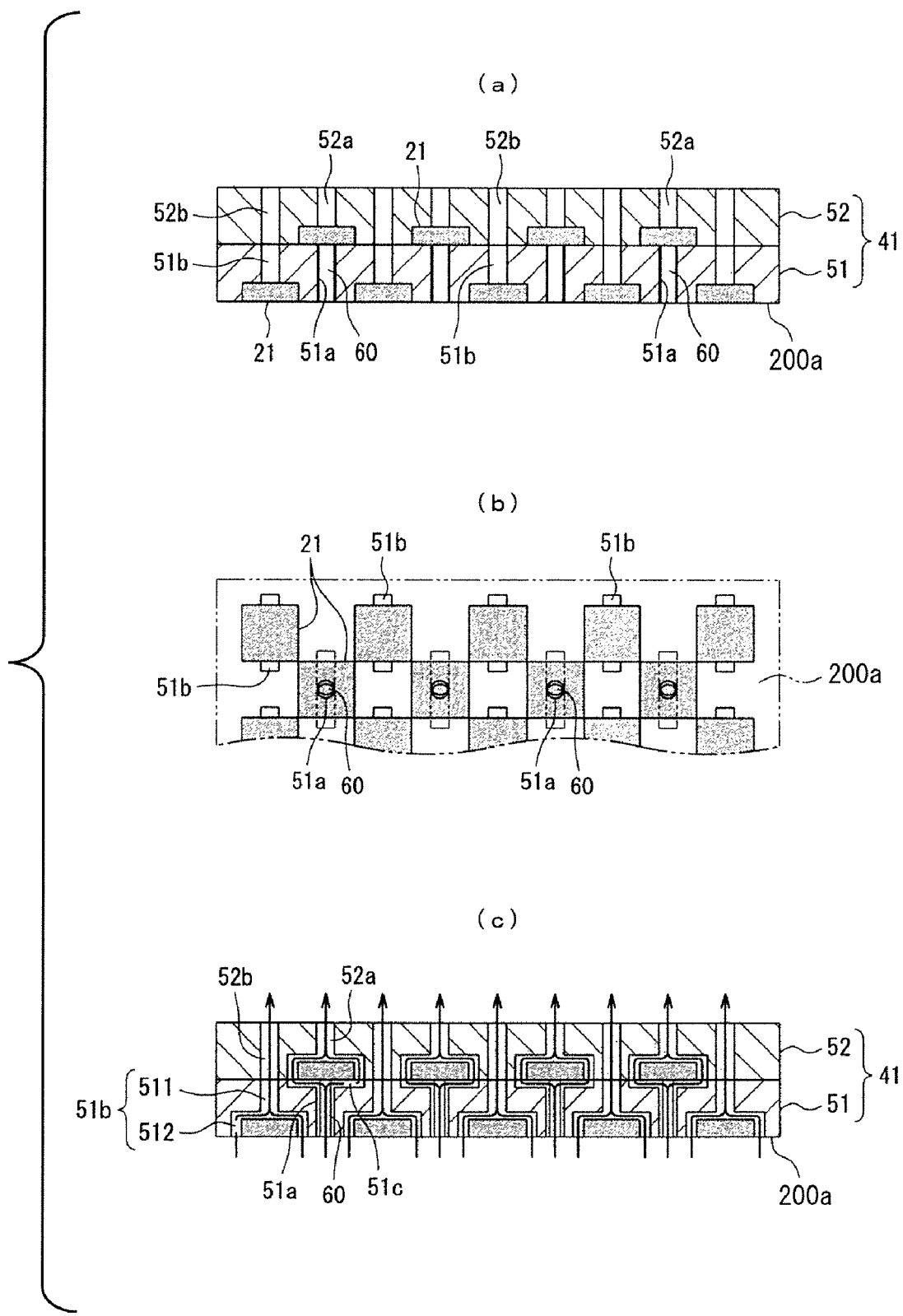
F I G. 6

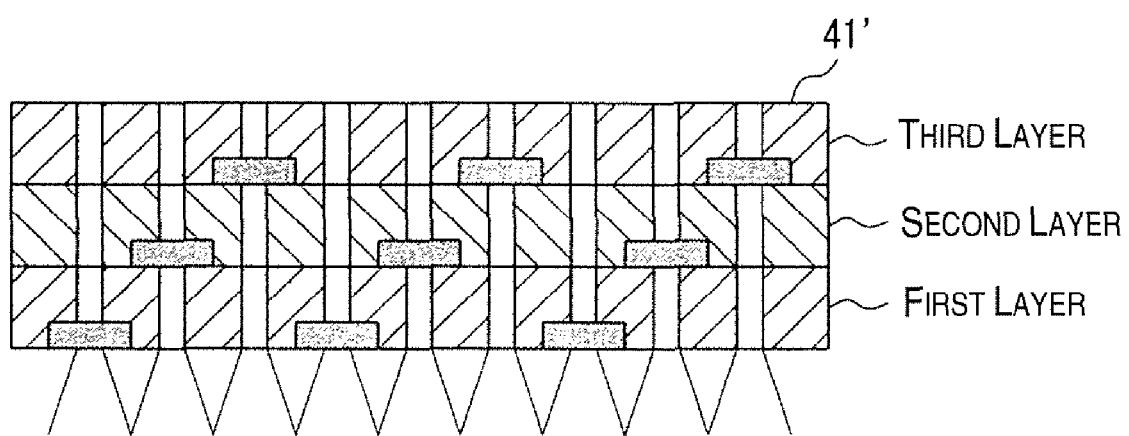
F I G. 7

LIGHT SOURCE DEVICE AND LIGHT SOURCE PACKAGING METHOD

CROSS-REFERENCE TO RELATED APPLICATIONS

This application claims priority to Japanese Patent Application No. 2008-059460 filed on Mar. 10, 2008. The entire disclosure of Japanese Patent Application No. 2008-059460 is hereby incorporated herein by reference.

BACKGROUND

1. Technical Field

The present invention relates to a light source device including a plurality of light emitting bodies, and to a light source packaging method for packaging a light source device including a plurality of light emitting bodies.

2. Related Art

Japanese Laid-Open Patent Application No. 2005-153193 proposes a technique for obtaining a desired light intensity by providing a plurality of light emitting bodies as a light source device.

SUMMARY

In the conventional light source device in which a plurality of light emitting bodies is provided as described in the above mentioned reference, a number of light emitting bodies sufficient to create the desired light intensity must be provided within a limited surface area. Therefore, the light emitting bodies are aligned in a plane so as not to waste space.

However, there is a need for a light source device that is capable of outputting a greater light intensity by utilizing a limited area of the light source device.

The present invention was therefore developed in view of this yet-unresolved problem of the prior art, and an object of the present invention is to provide a light source device and a light source packaging method with which a greater light intensity can be outputted by utilizing a limited area of the light source device.

A light source device according to the first aspect includes a base member and a light guiding section. The base member has a plurality of layers with each of the layers including a plurality of light emitting bodies, the base member having a light emitting surface. The light guiding section is arranged in the base member, and configured and arranged to guide light rays emitted from the light emitting bodies disposed in at least one of the layers to the light emitting surface.

Arranging the light emitting bodies in multiple layers makes it possible to provide a larger number of light emitting bodies in a limited area, and specifically to obtain a larger number of arranged light emitting bodies per unit area than in a case in which the light emitting bodies are arranged in a plane. Since the emitted light of the light emitting bodies is guided to the surface of the light emitting part by the light guiding section, the emitted light of the light emitting bodies of an upper layer as viewed from the side of the base member (i.e., as viewed in a direction parallel to a layering direction) can also be included in the light that is emitted from the light emitting surface of the base member. Consequently, since the emitted light of a larger number of light emitting bodies can be emitted from the light emitting part, the light intensity coming from a limited area can be further increased.

In the light source device described above, the light emitting bodies are preferably configured and arranged to emit the light rays generally in a light emission direction in which light rays are emitted from the light emitting surface, the light emitting bodies being arranged in each of the layers so that the light emitting bodies disposed on one of the layers are offset from the light emitting bodies disposed on the other of the layers when viewed in the light emission direction. The light guiding section preferably includes a light guide path extending from the light emitting surface in a direction parallel to the light emission direction.

Since the light emitting bodies are in a dispersed arrangement so as not to overlap with each other when viewed in the light emission direction, it is possible to prevent the light intensity from being irregularly concentrated in the area of irradiation by the light emitting part.

In the light source device described above, the light guiding section of the light emitting bodies preferably includes an optical fiber.

It is thereby possible to reduce loss of emitted light when the emitted light of the light emitting bodies is guided by the light guiding section to the light emitting surface.

In the light source device described above, each of the light emitting bodies preferably includes a surface-mounted light emitting body having a substantially flat emission surface. The base member is preferably formed by layering a plurality of substrates in which the light emitting bodies are embedded.

Since surface-mounted light emitting bodies are used as the light emitting bodies and embedded in a substrate, a base member in which light emitting bodies are provided in multiple layers can easily be obtained merely by layering the substrates.

The light source device described above preferably further includes an air-cooling mechanism. The base member preferably includes a ventilation path communicated with the air-cooling mechanism to cool the light emitting bodies of each of the layers.

Heat given off by the light emitting bodies readily accumulates when a multi-layer structure is used, but heat can easily be dissipated by providing a ventilation path to the base member.

The light source device described above preferably further includes an air-cooling mechanism. The light guiding section of the base member preferably forms at least a part of a ventilation path communicated with the air-cooling mechanism to cool the light emitting bodies of at least one of the layers.

Heat given off by the light emitting bodies readily accumulates when a multi-layer structure is used, but heat can easily be dissipated by providing a ventilation path to the base member. The light guide path can also be effectively utilized as a ventilation path, and a commensurate reduction in the size of the light source device can be anticipated.

In the light source device described above, the ventilation path preferably extends in the base member from a non-emitting side of each of the light emitting bodies to the light emitting surface via a portion adjacent to a side surface of the light emitting body.

The non-emitting side and side surfaces of the light emitting bodies are thereby cooled, and the light emitting bodies can therefore be effectively cooled.

A light source packaging method according to the second aspect includes arranging a plurality of light emitting bodies in each of a plurality of layers of a base member with the base member having a light emitting surface, and providing a light guiding section in the base member to guide light rays emitted from the light emitting bodies disposed in at least one of the layers to the light emitting surface.

Arranging the light emitting bodies in multiple layers makes it possible to provide a larger number of light emitting bodies in a limited area, and specifically to obtain a larger number of arranged light emitting bodies per unit area than in a case in which the light emitting bodies are arranged in a plane. Since the emitted light of the light emitting bodies is guided to the surface of the light emitting part by the light guiding section, the emitted light of the light emitting bodies of an upper layer as viewed from the side of the light emitting part can also be included in the light that is emitted from the light emitting part. Consequently, since the emitted light of a larger number of light emitting bodies can be emitted from the light emitting part, the light intensity coming from a limited area can be further increased.

In the light source packaging method as described above, the arranging of the light emitting bodies preferably includes arraigning the light emitting bodies to emit the light rays generally in a light emission direction in which light rays are emitted from the light emitting surface and arranging the light emitting bodies in each of the layers so that the light emitting bodies disposed on one of the layers are offset from the light emitting bodies disposed on the other of the layers when viewed in the light emission direction. The providing of the light guiding section preferably includes providing a light guide path extending from the light emitting surface in a direction parallel to the light emission direction.

Arranging the light emitting bodies in multiple layers makes it possible to provide a larger number of light emitting bodies in a limited area, and specifically to obtain a larger number of arranged light emitting bodies per unit area than in a case in which the light emitting bodies are arranged in a plane. The light emitting bodies are also arranged so that gaps between the light emitting bodies as viewed in plane are completed, the emitted light of the light emitting bodies is guided to the light emitting part by the light guide path that extends to the light emitting part in the emission direction of the light emitting bodies, the light emitting bodies are in a dispersed arrangement so as not to overlap with each other as viewed in plane, and light is emitted from the arrangement positions. It is thereby possible to prevent the light intensity from being irregularly concentrated in the area of irradiation by the light emitting part.

BRIEF DESCRIPTION OF THE DRAWINGS

Referring now to the attached drawings which form a part of this original disclosure:

FIG. 1 is a schematic cross sectional view of a light source device in accordance with a first embodiment of the present invention;

FIG. 2 includes a schematic cross sectional view (a) and a pair of plan views (b) and (c) of a base member of the light source device showing an arrangement of a plurality of light emitting bodies in the base member in accordance with the first embodiment;

FIG. 3 is a schematic cross sectional view of a light source device in accordance with a second embodiment of the present invention;

FIG. 4 includes a schematic cross sectional view (a) and a pair of plan views (b) and (c) of a base member of the light source device showing an arrangement of a plurality of light emitting bodies in the base member in accordance with the second embodiment;

FIG. 5 includes a schematic cross sectional view (a), a partial plan view (b) and a schematic cross sectional view (c) of the base member of the light source device showing an arrangement of a plurality of ventilation paths provided in the light source device in accordance with the second embodiment;

FIG. 6 includes a schematic cross sectional view (a), a partial plan view (b) and a schematic cross sectional view (c) of a base member of a light source device showing an arrangement of a plurality of ventilation paths and optic fibers provided in the light source device in accordance with a modified example of the second embodiment; and FIG. 7 is a schematic cross sectional view of a base member of a light source device in accordance with a modified example of the second embodiment.

DETAILED DESCRIPTION OF EXEMPLARY EMBODIMENTS

Referring now to FIG. 1, a light source device 100 in accordance with a first embodiment will be explained. FIG. 1 is a schematic cross sectional view of the light source device 100.

As shown in FIG. 1, the light source device 100 has a substantially rectangular block shape, and includes a base member 1, a heat sink 2 provided on the base member 1, and a fan 3 provided on the heat sink 2.

The base member 1 includes a pair of layered light source plates 11 and 12 having the same elongated rectangular plate shape. The surface of the light source plate 11 opposite the surface adjacent to the light source plate 12 forms a light emitting surface 100a (light emitting part) of the light source device 100. As shown in FIG. 1, a plurality of light emitting elements 21 is arranged in the light source plates 11 and 12.

FIG. 2 is a series of diagrams showing the state in which the light emitting elements 21 are arranged in the base member 1. More specifically, FIG. 2(a) is a schematic cross sectional view of the base member 1, FIG. 2(b) is a plan view of the base member 1 showing an arrangement of the light emitting elements 21 of the layers as viewed from above the base member 1, and FIG. 2(c) is a plan view of the base member 1 showing an arrangement of the light emitting elements 21 of the layers as viewed from below the base member 1.

In the light source plate 11, the light emitting elements 21 are spaced apart at intervals of about the size of one light emitting element 21 in the forward, backward, left, and right directions, as shown in FIG. 2, for example.

The light emitting elements 21 are arranged in the same manner in the light source plate 12 as well, and these light emitting elements 21 are also spaced apart at intervals of about the size of one light emitting element 21. However, the light emitting elements 21 mounted in the light source plate 12 are arranged in the positions of the spaces between the light emitting elements 21 that are arranged in the light source plate 11 as viewed in a plane, as shown in FIGS. 1 and 2. In other words, the light emitting elements 21 of the light source plate 12 are offset from the light emitting elements 21 of the light source plate 11 when viewed in a light emission direction in which light rays are emitted from the light emitting surface 100a of the light source device 100. The light emitting elements 21 are thereby arranged in a zigzag lattice or a checker board pattern as viewed in a plane so that the light emitting elements 21 are adjacent to each other at the corners thereof in the base member 1, as shown in FIGS. 2(a) and 2(b).

Each of the light emitting elements 21 preferably includes a surface-mounted light emitting diode (LED) or other light emitting element having a flat light emitting surface. The light emitting elements 21 have a substantially rectangular block shape in which one end surface thereof is a light emitting surface. The light emitting elements 21 are embedded in the light source plates 11 and 12 so that the light emitting surface of the light emitting elements 21 and the surfaces of the light source plates 11 and 12 are at approximately the same level as shown in FIG. 1.

As shown in FIG. 1, the light source plate 11 (the first layer of the layered structure) includes a plurality of light guide paths 11a extending in a direction parallel to the light emission direction from the light emitting surfaces of the light emitting elements 21 of the light source plate 12 (the second layer of the layered structure) to the surface of the light emitting surface 100a. The light guide paths 11a are disposed in positions corresponding to the light emitting surfaces of the light emitting elements 21 that are arranged in the light source plate 12 as shown in FIG. 1. The light guide paths 11a of the light source plate 11 and the light emitting surfaces of the light emitting elements 21 of the light source plate 12 thereby face each other when the light source plates 11 and 12 are layered together. The light emitted from the light emitting elements 21 of the light source plate 12 is guided through the light guide paths 11a to the light emitting surface 100a, and as a result, the light emitted from the light emitting elements 21 of the first-layer light source plate 11, and the light emitted from the light emitting elements 21 of the second-layer light source plate 12 are emitted from the light emitting surface 100a in the light emission direction.

As shown in FIG. 1, the heat sink 2 is layered on the surface of the light source plate 12 opposite from the surface thereof that is adjacent to the light source plate 11. The fan 3 is fixed to the heat sink 2.

The operation of the light source device 100 of the first embodiment will next be described.

The light emitted from the light emitting elements 21 arranged in the light source plate 11 is directly emitted without modification as the emitted light of the light source device 100 from the light emitting surface 100a. The light emitted from the light emitting elements 21 of the light source plate 12 that is layered on the light source plate 11 passes through the light source plate 11 via the light guide paths 11a and guided to the light emitting surface 100a, and then emitted from the light emitting surface 100a.

Consequently, the light emitted from the light emitting elements 21 arranged in the light source plate 11, and the light emitted from the light emitting elements 21 arranged in the light source plate 12 are emitted from the light emitting surface 100a.

When the light emitting elements 21 are used, the light emitting elements 21 need to be spaced apart from each other to a certain degree due to heat, routing of signal lines, and other factors. The area in which the light emitting elements 21 can be arranged therefore decreases in accordance with the spacing, and when the light emitting elements 21 are arranged in a limited plane such as a light source plate, the number of light emitting elements 21 that can be arranged in the light source plate is subject to certain limitations.

However, a configuration is adopted as described above in which the light source plates 11 and 12 in which a plurality of light emitting elements 21 is arranged are layered together, and the light emitted from the light emitting elements 21 arranged in both of the light source plates 11 and 12 is emitted from the light emitting surface 100a as the emitted light of the light source device 100. The light emitting elements 21 are arranged in the light source plates 11 and 12 so that the light emitting elements 21 arranged in each light source plate complement each other. Therefore, although an area is occupied by the base member 1 in the layering direction becomes relatively large, a larger number of light emitting elements 21 can be arranged within the limited area of the bottom of the light emitting surface 100a of the light source device 100.

Therefore, the light intensity per unit area of the light emitting surface 100a can be increased.

Since the light emitting elements 21 of the light source plate 12 are arranged so as to fill the spaces between the light emitting elements 21 arranged in the light source plate 11, light is radiated from light emitting elements 21 in a uniformly dispersed arrangement in the light emitting surface 100a. Therefore, uneven luminance in the light emitting surface 100a can be prevented, and substantially uniform luminance can be obtained.

Heat evolution must be taken into account particularly in the case of surface-mounted LED elements or the like. Because the heat sink 2 and the fan 3 are provided above the light source plate 12 as described above, the base member 1 is thereby cooled. Therefore, it is possible to prevent the temperature of the light source device 100 from increasing.

By layering the light source plates 11 and 12 as described above, the light intensity can be increased without increasing the surface area of the light emitting surface 100a. In other words, since the desired light intensity can be obtained even when the surface area of the light emitting surface 100a is small, the size of the light source device 100 can be reduced.

The spacing of the light emitting elements 21 in the light source plates 11 and 12 is also wider than when the light emitting elements 21 were arranged at the minimum necessary spacing in a single light source plate. Therefore, the light emitting elements 21 are easily cooled.

In the first embodiment as described above, the heat sink 2 and the fan 3 are provided as a cooling mechanism to the light source device 100. However, both of these components are not necessarily needed, and a configuration in which any one of the heat sink 2 and the fan 3 is provided may also be adopted.

The heat sink 2 and the fan 3 are also not necessarily integrally provided to the base member 1. For example, the fan 3 may be provided separately so that the light source device 100 is cooled by the fan 3.

Second Embodiment

Referring now to FIGS. 3 to 5, a light source device 200 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The light source device 200 of the second embodiment is the same as the light source device 100 of the first embodiment except that a base member 41 of the second embodiment has a different structure from the base member 1 of the first embodiment.

FIG. 3 is a schematic cross sectional view of the light source device 200 in the second embodiment. FIG. 4 includes a series of diagrams showing the state in which the light emitting elements 21 are arranged in the base member 41 of the second embodiment. More specifically, FIG. 4(a) is a schematic cross sectional view of the base member 41, FIG. 4(b) is a plan view of the base member 41 showing an arrangement of the light emitting elements 21 of the layers as viewed from above the base member 41, and FIG. 4(c) is a plan view of the base member 41 showing an arrangement of the light emitting elements 21 of the layers as viewed from below the base member 41.

As shown in FIG. 3, the light source device 200 in the second embodiment includes the base member 41, and a fan 42 that is mounted on the base member 41.

The base member 41 includes a pair of layered light source plates 51 and 52 having the same elongated rectangular plate shape. The surface of the light source plate 51 opposite the surface adjacent to the light source plate 52 forms a light emitting surface 200a (light emitting part) of the light source device 200.

In the light source plates 51 and 52, a plurality of light emitting elements 21 is arranged at predetermined intervals in the same manner as in the first embodiment described above, and the light emitting elements 21 are spaced apart so as to complement (be offset from) each other, as shown in FIGS. 4(b) and 4(c).

As shown in FIG. 5, the light source plate 51 includes a plurality of light guide paths 51a for guiding the light emitted from the light emitting elements 21 arranged in the light source plate 52 to the light emitting surface 200a of the light source device 200. Moreover, as shown in FIG. 5(c), the light source plate 51 includes a plurality of ventilation paths 51b that passes through from the surface adjacent to the light source plate 52 to the light emitting surface 200a of the light source device 200 along the light emitting elements 21 arranged in the light source plate 51. The light source plate 51 further includes a plurality of ventilation paths 51c that communicates with the light guide paths 51a.

The light source plate 52 includes a plurality of ventilation paths 52a that passes through from the surface of the light source plate 52 adjacent to the fan 42 (i.e., the surface opposite from the surface adjacent to the light source plate 51) to the light emitting surfaces of the light emitting elements 21 arranged in the light source plate 52 along the light emitting elements 21 arranged in the light source plate 52. The ventilation paths 52b that extend in a direction parallel to the light emission direction through the light source plate 52 are formed between the light emitting elements 21 arranged in the light source plate 52. The ventilation paths 52b are formed in positions that enable passage through the ventilation paths 51b formed in the light source plate 51 so that the ventilation paths 52b and the ventilation paths 51b are communicated when the light source plates 51 and 52 are layered together.

FIG. 5 includes a series of diagrams showing a detailed view of the ventilation paths 51b and 51c, and the ventilation paths 52a and 52b, wherein FIG. 5(a) is a schematic cross sectional view from the front (i.e., taken along a horizontal direction in FIG. 5(b)), FIG. 5(b) is a bottom view, and FIG. 5(c) is a schematic cross sectional view from the side (i.e., taken along a vertical direction in FIG. 5(b)).

Each of the ventilation paths 51b of the light source plate 51 includes a first ventilation path 511 that extends in a direction parallel to the light emission direction from the surface of the light source plate 51 adjacent to the light source plate 52 to the non-emitting surfaces of the light emitting elements 21, and a second ventilation path 512 that communicates with the first ventilation paths 511. The second ventilation path 512 is formed in a position so as not to impede wiring to the anode and cathode terminals of the light emitting elements 21.

For example, in the cross sectional view of FIG. 5(a) as viewed from the front, the near side of the drawing is defined as forward, and the far side of the drawing is defined as rearward, and the anode and cathode terminals are disposed on the left side and right side of the light emitting elements 21 in the drawing. In such a case, as shown in FIG. 5(c), the second ventilation paths 512 are formed in positions facing the front and back surfaces (left side and right side in FIG. 5(c)) of the light emitting elements 21, along the sides of the light emitting elements 21 from the non-emitting surfaces of the light emitting elements 21 while avoiding the positions of wiring to the anode and cathode terminals.

The second ventilation paths 512 are formed with a narrower width than the width of the front and rear side surfaces of the light emitting elements 21, and are formed in positions facing the vicinity of the center parts in the width direction of the front and rear side surfaces. One end of the second ventilation paths 512 is communicated with the first ventilation paths 511 on the side of the non-emitting surfaces of the light emitting elements 21, and the other end is formed so as to extend to the light emitting surface of the light source plate 51.

Therefore, the ventilation paths are formed that lead from the surface of the light source plate 51 adjacent to the light source plate 52 to the non-emitting surfaces of the light emitting elements 21 via the first ventilation paths 511, then from the non-emitting surfaces of the light emitting elements 21 along the sides to the light emitting surface of the light source plate 51 via the second ventilation paths 512.

As shown in FIG. 5(c), the ventilation paths 51c are formed in positions on the side of the light source plate 51 facing the front and rear positions in the front and rear direction of the light emitting elements 21 of the light source plate 52. The ventilation paths 51c are formed as trenches from the edges of the light guide paths 51a to positions somewhat farther than the sides of the light emitting elements 21 on the side of the opposing light source plate 52. The ventilation paths 51c are communicated with the ventilation paths 52a on the side of the light source plate 52 in positions facing the sides of the light emitting elements 21 on the side of the light source plate 52.

The ventilation paths 52a on the side of the light source plate 52 are formed in the same manner as the ventilation paths 51b of the light source plate 51, as shown in FIG. 5(c).

The ventilation paths 52b of the light source plate 52 are formed so as to pass through the light source plate 52 and extend vertically, and are communicated with the ventilation paths 51b of the light source plate 51 when the light source plates 51 and 52 are layered together, as shown in FIG. 5(c).

When the light source plate 51 and the light source plate 52 are layered together, the ventilation paths are thereby formed that run along the non-emitting surfaces and side surfaces of the light emitting elements 21 of the light source plate 52 via the ventilation paths 52a from the surface of the light source plate 52 on the opposite side from the surface adjacent to the light source plate 51, and pass through the light guide paths 51a from the ventilation paths 51c and through to the light emitting surface 200a.

The ventilation paths 52b of the light source plate 52 and the ventilation paths 51b of the light source plate 51 are communicated with each other, and the ventilation paths are formed that pass through the ventilation paths 52b and ventilation paths 51b from the surface of the light source plate 52 on the opposite side from the surface adjacent to the light source plate 51, and pass through to the light emitting surface 200a along the non-emitting surfaces and side surfaces of the light emitting elements 21 of the light source plate 51.

Returning to FIG. 3, the fan 42 is provided to the side of the light source plate 52 opposite from the side adjacent to the light source plate 51.

The operation of the second embodiment will next be described.

The light emitted from the light emitting elements 21 arranged in the light source plate 51 is emitted without modification as the emitted light of the light source device 200 from the light emitting surface 200a, the same as in the second embodiment described above. The light emitted from the light emitting elements 21 of the light source plate 52 that is layered on the light source plate 51 passes through the light source plate 51 via the light guide paths 51a formed in the light source plate 51, and is guided to the light emitting surface 200a.

As previously described, by layering the light source plates 51 and 52 together, ventilation paths are formed in the base member 41 that pass from the surface of the base member 41 on the side of the fan 42 to the light emitting surface 200a, and the ventilation paths are composed of the ventilation paths 52b of the light source plate 52 and the ventilation paths 51b of the light source plate 51. Therefore, when the fan 42 is an intake-type fan, operating the fan 42 causes air to flow from the ventilation paths 51b through the ventilation paths 52b and towards the fan 42 of the base member 41. Therefore, the non-emitting surfaces and side surfaces of the light emitting elements 21 of the light source plate 51 are cooled.

The ventilation paths that lead to the light emitting surface 200a from the surface of the base member 41 on the side of the fan 42 are formed in the base member 41, and the ventilation paths includes the ventilation paths 52a of the light source plate 52, and the ventilation paths 51c and light guide paths 51a of the light source plate 51. Therefore, operating the fan 42 causes air to flow toward the fan 42 of the base member 41 through the light guide paths 51a, the ventilation paths 51c, and the ventilation paths 52a, and the non-emitting surfaces and side surfaces of the light emitting elements 21 of the light source plate 52 are cooled.

Generally speaking, the efficiency of heat dissipation is adversely affected when the light emitting elements 21 are layered. However, because the light emitting elements 21 are cooled using ventilation paths and light guide paths as described above, the light emitting elements 21 can be effectively cooled, and the temperature can be prevented from increasing.

Efficient cooling is possible particularly because the ventilation paths lead to the non-emitting surfaces of the light emitting elements 21 and directly cool the light emitting elements 21.

Since the light guide paths 51a for guiding the light emitted from the light emitting elements 21 of the light source plate 52 to the light emitting surface 200a are used as ventilation paths, there is no need to provide separate ventilation paths, and a commensurate reduction of the size of the light source plates can be anticipated.

It is apparent that the same operational effects as those of the first embodiment can be obtained in the second embodiment.

MODIFIED EXAMPLE 1

In the first and second embodiments as described above, the light guide paths 11a, 51a are provided as a light guiding section, and the light emitted from the light emitting elements 21 arranged in the second-layer light source plate is guided to the light emitting surface 100a, 200a by the light guide paths 11a, 51a. However, the arrangement of the light guiding section is not limited to the arrangement in the illustrated embodiments.

For example, as shown in the diagrams (a) to (c) of FIG. 6, optical fibers 60 may also be used instead of the light guide paths 51a (or 11a in FIG. 1) as the light guiding section. In such a case, the light emitted from the light emitting elements 21 arranged in the second-layer light source plate may be guided to the light emitting surface 200a by the optical fibers 60. The use of optical fibers 60 is more effective because loss of light can be reduced during guiding of the light emitted from the light emitting elements 21.

When optical fibers 60 are used in this manner, the ventilation paths may be maintained by using the light guide paths 51a as ventilation paths, providing the optical fibers 60 within the ventilation paths, and forming gaps between the optical fibers 60 and the internal periphery of the light guide paths 51a as shown in FIGS. 6(a) to 6(c) when ventilation paths are formed for cooling as in the second embodiment. In this case, since there is no need to maintain spaces for providing the optical fibers 60, a commensurate size reduction of the base can be anticipated.

When the light is guided using the optical fibers 60 in this manner, it is not necessarily required that the light emitting elements 21 on the first layer be spaced apart so as to be offset from the light emitting elements 21 on the second layer. Specifically, the light emitting elements 21 may be arranged in any manner insofar as the light emitted from the light emitting elements 21 of the layers can be uniformly guided to the light emitting surface 200a.

MODIFIED EXAMPLE 2

In the first and second embodiments described above, two light source plates are layered to form the base member. However, the arrangement of the light source plates are not limited to the arrangement in the illustrated embodiments. For example, three light source plates may be layered as shown in FIG. 7, or three or more plates may be layered.

Layering three or more light source plates reduces the number of light emitting elements 21 arranged in a single light source plate by a commensurate amount. Heat is therefore dispersed, and more light guide paths and ventilation paths are formed in a single plate. The efficiency of cooling is therefore commensurately enhanced.

MODIFIED EXAMPLE 3

In the first and second embodiments as described above, the light emitting elements 21 are arranged in a zigzag lattice pattern (a checker board pattern) in a plan view. However, the arrangement of the light emitting elements 21 is not limited to the arrangement in the illustrated embodiment. For example, the spacing between light emitting elements 21 may be arbitrarily set based on the required light intensity, the size of the area that can be irradiated by a single light emitting element 21, and other factors. An aligned arrangement is also not necessary, and the light emitting elements 21 may be arranged so as not to overlap in the plan view, and so that uneven luminance does not occur in the light emitting surface 200a.

MODIFIED EXAMPLE 4

In the first and second embodiments as described above, the surface-mounted light emitting elements 21 are embedded in the light source plates, and the light source plates are bonded and layered together. However, it is not necessarily required that the light source plates be bonded and layered together.

A plurality of layers may be layered together via spaces, for example, and in such a case, light guide paths for guiding the light emitted from the light emitting elements 21 arranged in an upper-layer light source plate to the emission surface may be provided between the layers. When the plates are layered via spacers or the like in this manner, the light emitting elements 21 are not limited to surface-mounted light emitting elements, and bullet-shaped elements or other light emitting elements may also be used.

The light emitting elements 21 are also not limited to LED elements, and semiconductor lasers or the like may also be used.

When the light emitting elements 21 are embedded and arranged in the light source plates, an insulation material having high thermal conductivity may be injected between the light emitting elements 21 and the light source plates to enhance cooling properties.

In the embodiments described above, the light emitting elements 21 correspond to the light emitting bodies, and the light guide paths 11a, 51a correspond to the light guiding section. The light source plates 11, 12, 51, 52 correspond to substrates or layers, and the heat sink 2 and the fan 3, 42 corresponds to the air-cooling mechanism.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A light source device comprising:
   a base member having a plurality of layers with each of the layers including a plurality of light emitting bodies, the base member having a light emitting surface;
   a light guiding section arranged in the base member, and configured and arranged to guide light rays emitted from the light emitting bodies disposed in at least one of the layers to the light emitting surface; and
   an air-cooling mechanism,
   each of the layers of the base member including a plurality of ventilation paths corresponding to the light emitting bodies therein and communicating with the air-cooling mechanism to cool the light emitting bodies, with each of the ventilation paths extending in a portion of the corresponding layer adjacent to a lateral surface of a corresponding one of the light emitting bodies.

2. The light source device according to claim 1, wherein the light emitting bodies are configured and arranged to emit the light rays generally in a light emission direction in which light rays are emitted from the light emitting surface, the light emitting bodies being arranged in each of the layers so that the light emitting bodies disposed on one of the layers are offset from the light emitting bodies disposed on the other of the layers when viewed in the light emission direction, and
   the light guiding section includes a light guide path extending from the light emitting surface in a direction parallel to the light emission direction.

3. The light source device according to claim 2, wherein the light guiding section of the base member includes a plurality of light guide paths that at least partially form the ventilation paths corresponding to the light emitting bodies of at least one of the layers.

4. The light source device according to claim 1, wherein the light guiding section includes an optical fiber.

5. The light source device according to claim 1, wherein each of the light emitting bodies includes a surface-mounted light emitting body having a substantially flat emission surface, and
   the base member is formed by layering a plurality of substrates in which the light emitting bodies are embedded.

6. The light source device according to claim 1, wherein each of the ventilation paths extends in the base member from a non-emitting side of the corresponding one of the light emitting bodies to the light emitting surface via the portion adjacent to the lateral surface of the corresponding one of the light emitting bodies.

7. The light source device according to claim 1, wherein the layers of the base member are laminated so that no gap is formed between the layers.

8. A light source packaging method comprising:
   arranging a plurality of light emitting bodies in each of a plurality of layers of a base member with the base member having a light emitting surface;
   providing a light guiding section in the base member to guide light rays emitted from the light emitting bodies disposed in at least one of the layers to the light emitting surface;
   providing an air-cooling mechanism; and
   providing a plurality of ventilation paths corresponding to the light emitting bodies in each of the layers of the base members so that the ventilation paths communicate with the air-cooling mechanism to cool the light emitting bodies, with each of the ventilation paths extending in a portion of the base member adjacent to a lateral surface of a corresponding one of the light emitting bodies.

9. The light source packaging method according to claim 8, wherein
   the arranging of the light emitting bodies includes arranging the light emitting bodies to emit the light rays generally in a light emission direction in which light rays are emitted from the light emitting surface and arranging the light emitting bodies in each of the layers so that the light emitting bodies disposed on one of the layers are offset from the light emitting bodies disposed on the other of the layers when viewed in the light emission direction, and
   the providing of the light guiding section includes providing a light guide path extending from the light emitting surface in a direction parallel to the light emission direction.

* * * * *